United States Patent [19]
Arnold et al.

[11] Patent Number: 5,666,633
[45] Date of Patent: Sep. 9, 1997

[54] METHOD OF PRODUCING INTERLOCKING METAL PARTS

[75] Inventors: Norbert Arnold, Waldachtal; Bernd Hein, Freudenstadt; Guenter Seibold, Pfalzengrafenweiler; Manfred Haage, Dornstetten; Bernd Plocher, Rottenburg, all of Germany

[73] Assignee: fischerwerke, Artur Fischer, GmbH & Co. KG., Waldachtal, Germany

[21] Appl. No.: 519,665

[22] Filed: Aug. 25, 1995

[30] Foreign Application Priority Data

Aug. 25, 1994 [DE] Germany .................... 44 30 130.8

[51] Int. Cl.⁶ .................................................. B22F 1/00
[52] U.S. Cl. ........................... 419/10; 419/11; 419/19
[58] Field of Search .......................... 419/10, 11, 19

[56] References Cited

U.S. PATENT DOCUMENTS 5,162,157  11/1992  Tanaka et al. .................. 428/549
5,433,870  7/1995  Nakamura et al. ............... 252/12.4
5,445,788  8/1995  Turenne et al. .................. 419/42

*Primary Examiner*—Charles T. Jordan
*Assistant Examiner*—Anthony R. Chi
*Attorney, Agent, or Firm*—Michael J. Striker

[57] ABSTRACT

Interlocking metal parts that slide under pressure on one another are manufactured so that at least one metal part is manufactured by a powdered metal injection-molding method, an in order to improve the sliding behavior and to minimize the binding tendency, a non-metallic substance having a structured arrangement of molecules is admixed in powdered or granular form with the powdered metal of the metal part manufactured by powder injection molding. The substance is inert towards the metal and has a thermal stability of at least 900° C. In particular, ceramic solid materials or fillers are suitable substances.

7 Claims, 1 Drawing Sheet

METHOD OF PRODUCING INTERLOCKING METAL PARTS

BACKGROUND OF THE INVENTION

The present invention relates to a method of producing interlocking metal parts. More particularly it relates to a method of producing such metal parts which slide under pressure on one another.

Metal parts that slide under pressure on one another are used for example in fixing technology of expansible metal fixing plugs. Usually such a plug includes an expansible sleeve and an expander body which is drawn or driven into the expansible sleeve to anchor the latter. When for preventing corrosion the two parts of the expansible metal fixing plugs that slide on one another during anchoring are composed of the same stainless steel having an austenitic crystalline structure, then the two surfaces sliding on one another start to bind at high expansion pressures during the anchoring process. As a result, the operation of the expansible fixing plug is considerably impaired by the binding. In particular, such a fixing plug is unsuitable for use in the tensile zone, since in the enlargement of the drilled hole as a result of cracks forming cannot be compensated since the fixing plug lacks the ability to expand subsequently.

It is therefore conventional to manufacture the parts of the expansible metal fixing plug from steel of different crystalline structure. Since however they can be manufactured and supplied only in large numbers, this possibility is not practicable in most cases. Furthermore, adequate homogeneity in the crystalline structures of the steels which is effective in reducing the tendency to bind with sufficient reliability, is not achieved.

In order to avoid difficult machining of austenitic steels, it is known to manufacture in particular sleeve-shaped parts by powdered metal injection-molding method (MIM-method). For this purpose the powdered metal is mixed with the desired allowing additions present in powder form and plasticized in a heated kneader with assistance of polymeric organic binders such as waxes and plastics, and then granulated. Processing on conventional injection-molding machines is consequently possible. An injection-molding tool of a similar construction to a plastic material injection-molding tool is utilized as the mold. The injection-molded shaped bodies (preforms) are put into a binder-removing furnace to eliminate the binder. During the binder-removing process, the molecular change of the binder collapse as a result of thermal or chemical decomposition. At the same time, pre-sintering of the metallic shaped bodies takes place which imparts adequate stability to them. During sintering which is carried out in vacuum or under a protective gas, the metallic injection-molded parts receive their final material characteristics and shape. With this method it is therefore possible to use small amounts of different steels and to manufacture finished products.

SUMMARY OF THE INVENTION

Accordingly, it is an object of the present invention to provide a method of producing interlocking metal parts which is a further improvement of the existing methods.

More particularly, it is an object of the present invention to provide a method of producing interlocking metal parts with which a binding tendency of interengaging metal parts sliding on one another under pressure is reduced so that their operation is improved.

In keeping with these objects and with others which will become apparent hereinafter, one feature of the present invention resides, briefly stated, in a method of manufacturing interlocking metal parts that slide under pressure on one another, in particular for manufacture of a fixing element including an expansible sleeve and an expander body and anchorable by axial displacement of the expander body in the expansible sleeve, with at least one metal part manufactured by powder injection molding, wherein in accordance with the present invention a non-metallic substance having a structured arrangement of molecules is admixed in powdered or granular form with the powdered metal of the metal part to be manufactured by powder injection molding, the substance being inert towards the metal and having a thermal stability of at least 900° C.

Because of the substance admixed with and inert toward the powdered metal, in accordance with the present invention, individual molecules or molecular clusters of the substance accumulate at several points of the lattice within the crystalline structure or at the grain boundaries thereof, of the metal part manufactured by the MIM method. As a result, the two materials of slightly different crystalline structure are in opposition. This leads to the desired reduction in the binding tendency when the two parts slide on one another. Ceramic solid materials such as barium sulphate ($BASO_4$) or titanium oxide ($TiO_2$) have proved especially suitable as the substance to be admixed with the powdered metal.

A similar effect can be achieved by admixing as the substance a filler, preferably $C_{60}$ filler, with the powdered metal. The spherical $C_{60}$ carbon molecule produces a lubricating layer having especially favorable sliding properties at the surface of the metal part.

In accordance with a further feature of the present invention, the sliding characteristics can be influenced by different proportions by weight of the admixed substance. Proportions by weight of 0.01 to 1% are suitable for the admixture of the filler. For ceramic solid materials, higher proportions by weight are advantageous.

The manufacture of the two interlocking metal parts is possible by making both parts in manufacturing processes that are independent of one another, and then combining them in an assembly process. In order to spare the assembly process, it is also possible, however, to manufacture the interlocking parts such that a separation layer of plastic material is applied to one part in the injection-molding method, subsequently the further part is injected onto the separation layer by powder injection-molding, the thickness of the separation layer is selected to correspond at least to the contraction of the further part, and after the injection the separation layer and the binder eliminated during the binder-removing and sintering process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
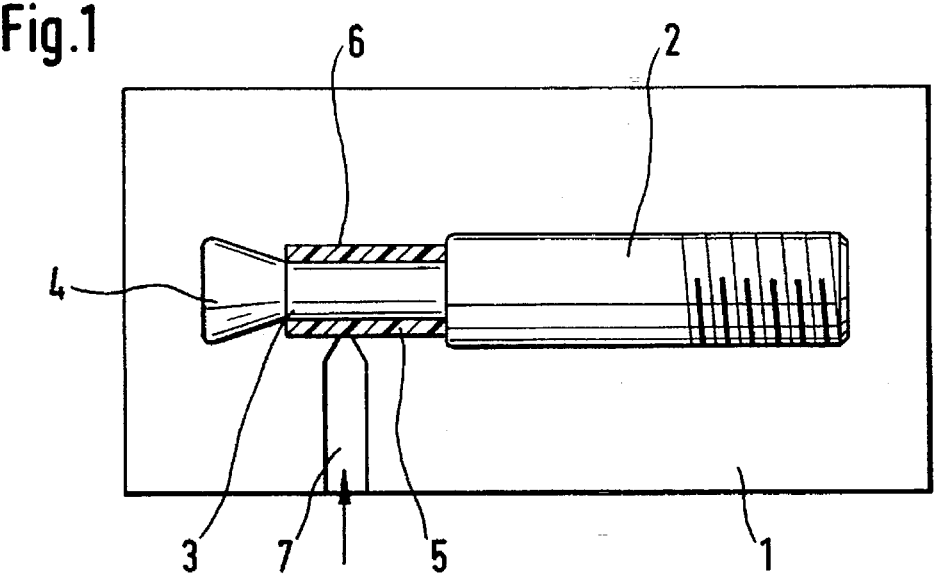
FIG. 1 is a view schematically showing a mold matrix for injection of a separation layer onto a metal bold as an inserted part, in accordance with the inventive method.
Figure 2:
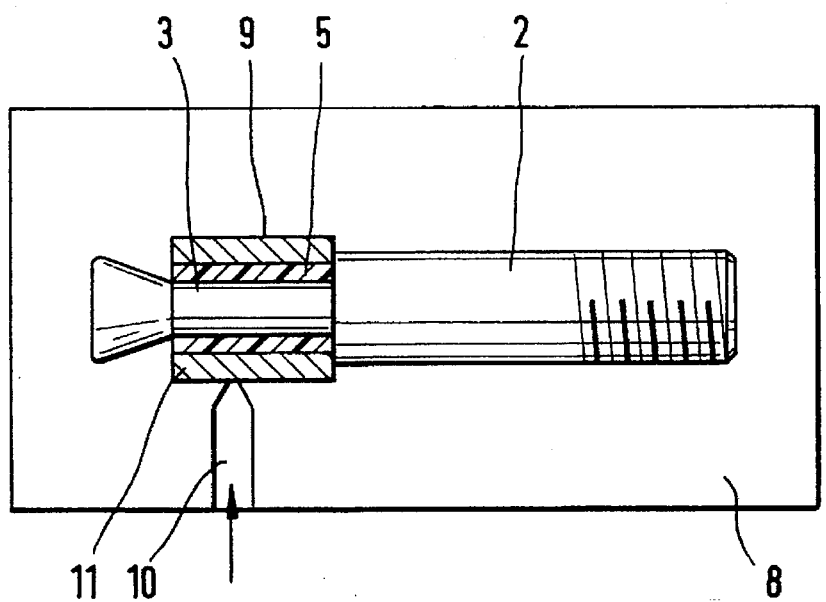
FIG. 2 is a view showing the mold matrix for injection of a second metal part onto the separation layer, in accordance with the present invention.
Figure 3:
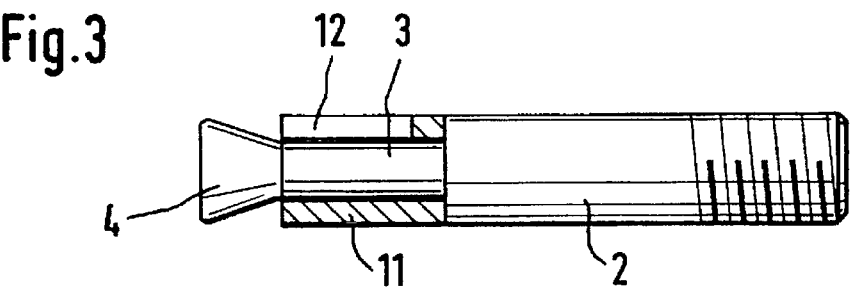
FIG. 3 is a view showing the metal bolt with applied expansible sleeve after a binder-removing and sintering process.

A new method of manufacturing of two interlocking metal parts are illustrated in the manufacture of parts of an expansible anchor, as schematically shown in FIGS. 1, 2 and 3. A metal bolt 2 is manufactured in conventional manner or by a powdered metal injection molding process and inserted in a mold matrix 1. The metal bolt 2 has a reduced portion 3 adjoining an expander cone 4.

The mold matrix has a cavity 6 which surrounds the reduced portion 3 for applying a separation layer 5 of plastic material to the reduced portion. The cavity 6 is filled through an injection channel 7 during a first injection molding operation. After insertion of the bolt 2 provided with the separation layer 5 in the injection mold 8 as shown in FIG. 2, the powdered metal mixture mixed with a binder is injected into the cavity 6 through an injection channel 10. The substance, the ceramic solid material or a filler which produced desired sliding characteristics in a finished state of the fixing element to be manufactured as illustrated in FIG. 3, has already been admixed with the powdered metal mixture in a separate operation. After the powder mixture has been injected, an interlocking arrangement of the further part in form of an expansible sleeve 11 is obtained on the reduced portion 3 of the bolt 2. The binder-removing and centering process is subsequently carried out, in which both the binder and the separation layer are eliminated. The free space produced by the thickness of the separation layer 5 which has been removed permits contraction of the expansible sleeve 11 that occurs in the binder-removal and sintering. The thickness of the separation layer 5 in the shown embodiment has been dimensioned so that a freedom of movement allowing axial displacement is provided between the expansible sleeve 11 and the reduced portion 3 of the bolt 2.

The expansible sleeve 11 can be also provided with one or more longitudinal slits 12. In this construction when the expander cone 4 is drawn into the expansible sleeve 11, expansion of the expansible sleeve 11 is improved.

When the fixing element is anchored in a structural component, a pressure is exerted during the expansion process by the material of the structural component surrounding the expansible sleeve. In particular, with the combination of two identical steels, this pressure could lead to binding of the two surfaces sliding on one another. However, because of the substance incorporated in the part manufactured in the powdered metal injection molding method, that metal part has a crystalline structure which leads to a favorable sliding behavior.

The method of manufacturing in accordance with the present invention is therefore especially suitable for a fixing element 1 shown in FIG. 3, in which during axial displacement between the expander 3 and the expansible sleeve 11, an expansion effect is to be achieved.

It will be understood that each of the elements described above, or two or more together, may also find a useful application in other types of methods differing from the types described above.

While the invention has been illustrated and described as embodied in a method of producing interlocking metal parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of manufacturing interlocking metal parts sliding under pressure on one another, comprising the steps of making at least one metal part by powder injection molding; and mixing to a powdered metal of the at least one metal part a non-metallic substance which has a structural arrangement of molecules, is inert toward a metal of the art least one metal part and has a thermal stability of at least 900°, said non-metallic substance admixed with the powdered metal being a $C_{60}$ filler.

2. A method as defined in claim 1, wherein said step of mixing includes mixing the non-metallic substance with the powdered metal of the at least one metal part in powdered form.

3. A method as defined in claim 1, wherein said step of mixing includes mixing the non-metallic substance with the powdered metal of the at least one metal part in granular form.

4. A method as defined in claim 1, wherein a proportion by weight of the non-metallic substance in the powdered metal is 0.1–100%.

5. A method as defined in claim 1, wherein a proportion by weight of the filler in the powdered metal is 0.01–1%.

6. A method of manufacturing interlocking metal parts sliding under pressure on one another, comprising the steps of making at least one metal part by powder injection molding; mixing to a powdered metal of the at least one metal part a non-metallic substance which has a structural arrangement of molecules, inert toward a metal of the at least one metal part and has a thermal stability of at least 900° C.; and applying a separation layer on one of the parts by injection molding; injecting another of the parts onto the separation layer by injection molding; and subsequently eliminating the separation layer and a binder by binder-removing and sintering.

7. A method as defined in claim 6, wherein said step of applying the separation layer includes selecting a thickness of the separation layer corresponding at least to a contraction of the other part.

* * * * *